2,953,451
METALLURGICAL PROCESS

Marvin J. Udy and Murray C. Udy, Niagara Falls, N.Y., assignors to Strategic-Udy Metallurgical & Chemical Processes, Ltd.

No Drawing. Filed Feb. 27, 1958, Ser. No. 717,839

18 Claims. (Cl. 75—31)

This invention relates, in general, to improvements in metallurgical processes. More particularly, the invention contemplates the provision of an improved process for the production and recovery of separate valuable commercial products consisting of ferronickel, iron and ferrochromium from relatively low-grade nickel-bearing iron ores, laterites, nickel-bearing serpentines, and other nickel-bearing silicates.

It has been proposed, heretofore, to treat certain ores of the general class described by reduction within a blast furnace for the direct separation and recovery of their iron values, but such practice results in alloying of the nickel content of the ores with the metallic iron product recovered from the blast furnace. Since this nickel content is undesirable for many purposes, most recent techniques advocate various means for treating the ores, preliminarily, to remove or substantially reduce their nickel content with the formation of suitable nickel-free reduction burdens. These techniques have included such diverse practices as (1) selectively chloridizing either the iron or nickel values from the ores, (2) acid leaching of the ores for nickel recovery, (3) ammonia leaching of the ores for nickel recovery, and (4) effecting selective carbothermic reduction of the ores for preliminary removal of the nickel in the form of a ferronickel alloy.

With respect to the latter type of benefication operation, we have found that the general methods of smelting practiced heretofore, and particularly the fluxing techniques used in connection with such smelting operations, usually result in the production and recovery of relatively impure end-products, in that, among other things, the chromite content naturally present within most of the above-enumerated ores is reduced and alloyed within both the ferronickel and iron products obtained therefrom.

It has been proposed, also, to avoid contamination of the ferronickel alloy with chromium metal in the foregoing type of operation, by conducting a two-stage selective carbothermic reduction with lateritic iron ore, for example, in which a portion of the iron oxide content of the ore, together with substantially all of the chromium oxide contained therein, are retained within the slag resulting from the initial smelting operation conducted for the production of the desired ferronickel. The resulting iron oxide-chromium oxide slag is then subjected to a second stage of smelting in which total or complete reduction is practiced for the production and recovery of a ferrochromium alloy containing the remainder of the iron and substantially all of the chromium present within the original ore. This type of modified operation is inherently disadvantageous for the reason that substantial iron credits, over and above the iron required for alloying with the nickel content of the ores, must be recovered in alloyed form with chromium; an alloy which is often of no direct commercial value for the reason that its chromium content is excessive from the standpoint of routine steel operations, but usually insufficient to justify use of the product as a raw material in chrome-steel operations.

The process of the present invention is based, in part, on our discovery of certain unique fluxing and smelting techniques, whereby substantially chrome-free ferronickel and iron products, and, if desired, a commercial ferrochromium alloy, can be separated and recovered from nickel-bearing iron ores, laterites, and similar ores of the general class described. In essence, the process of the invention involves an initial selective carbothermic reduction of the ore or concentrate under such conditions as to produce a substantially chrome-free ferronickel alloy and an iron-enriched molten slag product; followed by a second selective carbothermic reduction of the molten iron-bearing slag recovered from the first stage for the production and recovery of metallic iron of low-nickel and low-chromium contents, and a controlled iron oxide-bearing residual slag containing the majority of the chromium oxide content of the original ore or concentrate. Depending upon the relative concentration of chromium oxide contained within the original ore, the process further involves the treatment, preferably while still molten, of the final residual slag product by carbothermic reduction for the separation and recovery of a chrome-iron alloy containing on the order of from 20 to 50% chromium metal.

In the general practice of the process of the invention, an ore or concentrate of the indicated composition may be calcined or otherwise treated, initially, to provide a reduction burden of substantially constant composition, which is thereafter fluxed by the addition of selected base and acid constituents to form a charge capable of producing a relatively high melting point slag in the subsequent smelting operation, as explained more fully hereinafter. Alternatively, in accordance with preferred operating technique, we can admix the raw ore with the necessary fluxing materials, and thereafter calcine the combined mass to produce a substantially stabilized reduction burden of predetermined base-acid ratio. In either event, we employ magnesia as the basic flux component with respect to silica, in lieu of conventional basic fluxes such as lime or limestone. The magnesia may be employed as such, or in combination with calcium oxide in the form of a true dolomite of natural or simulated composition, or we may employ a natural magnesium silicate such as serpentine, or serpentine-like magnesium silicates in which some of the magnesium is replaced by nickel, such as garnierite and the like, or a magnesite in combination with silica. It is found that such magnesia-silica and magnesia-lime-silica flux systems are ideally suited for use in the production and recovery of ferronickel as well as iron and steel from ores of the type specified hereinbefore.

In the carbothermic processing of ores of the general class described as usually practiced heretofore, it is customary to flux the iron content of the ores with basic fluxes in the form of lime or limestone, virtually exclusively, with the result that the melting point of the resulting slags is generally too low to permit the production of high-grade ferronickel other than on a batch basis. Theoretically, the melting point of such slags can be raised to an effective value for continuous operations by further increasing the concentration of lime therein, but we have found that the quantity of additive-lime required to effectively raise the melting point, rather than lowering it, becomes excessive, resulting in dilution of the iron oxide content of the slags to an extent that they become impractical to treat on any economical basis. In addition, high-iron-calcium silicate slags of this general type tend to be extremely corrosive towards furnace linings and bottoms.

In contrast with the foregoing, it has been found as a result of our investigations that magnesia-silica and magnesia-lime-silica flux systems of the types specified hereinafter, effectively overcome all of the major disadvantages inherent in similar operations conducted with lime and limestone fluxes. Thus, the slag systems of our invention can be maintained at the optimum high temperatures required for reduction and removal (i.e., tapping) of ferronickel (or iron) in the fluid, molten state without excessive power input to the furnace. Furthermore, as explained in greater detail hereinafter, the severe corrosive action normally to be expected from slags of equivalently high-iron contents is totally eliminated through use of the unique fluxing techniques of the invention, with the result that one can operate on a continuous basis, even with magnesite-lined furnaces, for example, without encountering excessive shut-down time for repair of furnace linings and bottoms. Of course, the advantages to be gained through permissive use of a non-carbonaceous furnace lining with respect to the quality of end-product iron, for example, will be obvious to any skilled technician. In addition, since the process of the invention proceeds initially to the production of ferronickel, followed by the production of metallic iron through reprocessing of the slag remaining after recovery of the ferronickel, we have found that the use of the relatively lighter magnesia fluxes results in less dilution of the initial slag as compared with calcium oxide fluxes, thereby maintaining the iron oxide content of the slag relatively high, and simplifying ultimate recovery of metallic iron therefrom.

Significantly, while certain other prior investigators have postulated that high-iron slag systems intended for use in conjunction with ores of the general class described should be of an acid nature to provide satisfactory operating conditions, we have found that the magnesia-silica and magnesia-calcium oxide-silica slag compositions of the invention are ideally suited for the production of ferronickel, as well as iron and steel, from lateritic ores and the like, when proportioned within the range of approximately one to one and one-quarter (1.0–1.25) parts of basic constituents to each part of acid constituents, or more precisely, when comprised of from one to one and one-quarter parts by weight magnesia and other basic components such as calcium oxide (all calculated to MgO equivalency, but excluding iron oxide as a base), to each part by weight silica. In point of fact, while the 1.0–1.25:1 base-acid ratios represent optimum operating conditions, the base-acid ratios of the high-iron slag systems of the invention may be constituted anywhere within the range of from one to two-and-a-quarter 1.0–2.25) parts by weight base (calculated as MgO and excluding iron oxide) to each part by weight silica, and entirely satisfactory results are obtained. In general, it is found that the base-acid ratios of the slag systems of the invention can be varied anywhere within this wider range to achieve optimum operating conditions as a function of power input to the furnaces.

In the production of the magnesia-calcium oxide-silica slag systems of the invention, it is most advantageous to employ magnesia in an amount at least equivalent to that found in a true natural dolomite, namely, approximately one mole of magnesia for each mole of calcium oxide contained therein. That is to say, the basic flux additive should have a magnesia content of at least 21 percent or the equivalent on a carbonate basis (Dana's Textbook of Mineralogy, W. E. Ford, page 516, 4th edition, John Wiley and Sons, New York, New York). Of course, as pointed out hereinbefore, greater amounts of magnesia can be employed, or magnesia, per se, may be employed exclusively as the basic flux in the practice of our invention.

It is believed that such ratios of base components in the form of magnesia and magnesia-lime mixtures or compositions, in combination with acid flux in the form of silica, render possible the reduction of the nickel oxide of the ores and settling of metallic nickel into the ferronickel alloy in the presence of the otherwise high concentrations of iron (i.e., 35% and higher) within the residual slags. In order to insure good fluidity of such slags at high temperatures, and particularly the second stage slags which are processed for iron recovery, thereby facilitating complete settling of metallic values therefrom, one may add further quantities of fluxing components, maintaining the desired optimum base-acid ratios specified above, while providing a sufficient volume of slag to achieve this desired effect. For example, if the natural silica content of an ore is relatively low, while one may practice magnesia or magnesia-calcium oxide fluxing to obtain a base-acid balance within the desired optimum range, it may be that the overall volume of the resulting slag mass will be insufficient to provide good settling action. Under these conditions, it is merely necessary to add synthetic slag of the same desired base-acid ratio, practicing simple volumetric dilution, so to speak, to whatever extent may be necessary or desirable. Ordinarily, the slag volume in the first stage will be found to be adequate following fluxing to establish the desired base-acid properties as specified above, but dilution by the addition of synthetic slag may be desirable prior to treatment of the first stage residual slag for iron recovery in the second stage.

Provided a flux ratio within the preferred optimum range of from 1.0–1.25 parts base to each part acid is established within the initial charge to the first stage for ferronickel production, then it is not necessary to practice any further fluxing (other than simple dilution) within the second stage smelting for iron recovery. On the other hand, if fluxing of the initial charge for ferronickel recovery is practiced such as to establish a base-to-acid ratio of from 1.25 to 2.25 parts by weight base to each part by weight acid, i.e., ratios within the upper limits of the somewhat wider permissive range for ferronickel production as specified hereinbefore, it is usually advisable to add some additional silica, alumina or fluorspar to the second stage, since the slags will otherwise tend to become viscous upon reduction and removal of their iron oxide content. In essence, such additions are controlled such as to establish the second stage slag at or near a base-acid ratio within the optimum range of 1.0 to 1.25 parts base to each part acid. The addition of an acid flux effectively reduces the concentration of base components to values within the optimum range. Quite naturally, however, it is most advantageous to adjust to the optimum range within the first stage so that the charge can be processed through both stages without intermediate fluxing between stages.

In actual practice of the process of the invention, we prefer to flux the raw ore with magnesia or magnesia and calcium oxide, together with any silica that may be required over and above the natural silica content of the ore, to establish the prescribed base-acid ratio of from 1.0 to 2.25 parts by weight base (taken as MgO) to each part by weight acid. The resulting charge is then calcined by heating within any suitable apparatus, such as a rotary kiln, to establish it at the maximum possible temperature for a freeflowing consistency, without overheating to the extent that the charge will form rings within the kiln. Ordinarily, this can be accomplished by heating the charge to a temperature within the range 1100 to 1300° C. We have found that the stabilization of the ores provided by preliminary calcining is necessary for subsequent selective reduction. Of course, the charge can be melted directly within an electric furnace, but we find that the use of a kiln with gas, oil, coal or even waste gases from an electric furnace, provides a more economical operation as compared with the use of electrical energy exclusively. Furthermore, we prefer to operate within successive stages of the process of the invention with molten charge material recovered from a preceding stage in order to further economize on power consumption by avoiding the necessity for remelting the various reduction burdens. If desired, pre-reduction can be practiced to some extent within the kiln such that a major portion of the ferric iron is reduced to the ferrous state, and a small part to the elemental state.

The hot, free-flowing material from the kiln is then passed directly into the smelting zone of an electric furnace maintained at a temperature above 1500° C., together with a sufficient amount of carbonaceous reducing material to effect reduction of substantially all of the nickel oxide contained therein, and that portion only of the iron oxide required for the production of a ferronickel alloy of any desired nickel content. Preferably, the reducing agent should be of such a size and density that it will be wetted by and react readily with the slag. We have found that particle sizes within the range of approximately 1/16" to 1/2" are entirely satisfactory. In the absence of any pre-reduction in the kiln, the addition of the carbonaceous reducing material to the furnace burden should include an excess over and above that required for production of the desired ferronickel alloy, in order to effect reduction of a major portion of the ferric iron content of the ore to the ferrous state, in which form it combines chemically with the flux components for the formation of a stable high melting point slag.

In the presence of a flux system of the type described above, the recovery of the desired ferronickel alloy can be effected virtually without contamination resulting from reduction of chromium oxide contained within the original ore, in that the chromium oxide will remain with the iron oxide within the molten slag product produced. If necessary or desirable under specific operating conditions, a holding furnace may be employed intermediate the first and second stages and/or the second and third stages to effect complete settling of metallic shot from the molten slags, and to maintain a reservoir of molten material to insure a smooth cycle of operations. Preferably, the smelting practices employed in the selective reduction of iron and nickel for the formation of ferronickel within the first stage of the process of the invention, correspond to those described in copending U.S. applications Serial Numbers 553,645 and 643,524 of Marvin J. Udy, filed on December 16, 1955, and March 4, 1957, respectively.

It should be mentioned that the greatest majority of ores of the class which can be treated by the processing techniques of the invention, include varying amounts of cobalt in addition to their nickel content. For the most part, if the nickel concentration within the ferronickel alloy produced is maintained relatively low, i.e., on the order of about four to ten percent (4–10%), we find that proportionately larger amounts of the cobalt can be retained within the residual slag. At higher concentrations of nickel within the ferronickel alloy, there is a tendency for larger proportions of the cobalt to be reduced into the alloy, and, under these conditions, it may be desirable to treat the high-nickel alloy for separation of nickel and cobalt. This cobalt partitioning effect can be employed to advantage in controlling, to a limited extent, the relative concentrations of cobalt between the ferronickel and pig iron produced in the first and second stages, respectively.

In the second stage smelting operation of the invention, the molten iron-oxide slag recovered from the first stage is passed to a second electric furnace, wherein carbonaceous material of proper size and density is added in an amount sufficient to effect reduction to the elemental state of the major portion of the iron contained therein. In this connection, it should be noted that prior workers have advocated practicing total reduction of the iron oxide content of slags which are recovered after reduction and removal of nickel from a laterite ore or concentrate, for example, and, as pointed out hereinbefore, such practice usually results in the simultaneous reduction and alloying within the reduced iron, of any chromium present within the original ore. In contrast thereto, we have found on the basis of our investigations with the unique fluxing and smelting practices of the invention that, provided a controlled portion of the total available iron oxide is left unreduced within the residual slag from the iron recovery stage, substantially all of the chromite will also remain within this slag and will not contaminate the larger proportions of iron which are reduced and recovered in elemental form. Thus, it has been our observation that the presence of as little as three percent (3%) by weight of iron oxide, to a maximum of ten percent (10%) by weight, and preferably about six to eight percent (6–8%) by weight, within the residual slag, will generally function to maintain the metallic iron product substantially free of excessive chromium metal. Accordingly, in the second stage smelting operation of the invention, the $FeOSiO_2MgO$ or $FeOSiO_2MgOCaO$ slag recovered from the first stage is smelted with deficient carbonaceous reducing material, such as to retain at least three to ten percent (3–10%) by weight of the iron oxide within the slag remaining after recovery of the metallic iron. In addition, carbon within the pig iron recovered in this stage should be kept below about two percent (2.0%), since at carbon concentrations above 2% the chromium will tend to come down into the iron. When employing a magnesia-lined furnace, carbon in the "pig iron" can be kept to values below approximately 0.5%, thereby producing, in effect, a medium carbon steel. As previously pointed out, the slag systems effectively prevent attack of the MgO lining. Control of carbon within the pig iron can be readily maintained below approximately two percent (2.0%) even in a carbon-lined furnace.

Of course, where the chromium content of the original ore justifies its recovery, the iron oxide content of the second-stage slag can be so adjusted as to provide for the ultimate recovery of a valuable ferrochromium alloy therefrom. In such an operation, the molten slag from the second stage is simply transferred into a small electric furnace and the iron oxide and chromic oxide are reduced therewith with carbonaceous reducing material to produce a chrome-iron alloy containing from twenty to fifty percent (20–50%) chromium. Preferably, each of the second and third stage smelting operations are also conducted in accordance with the techniques described in the aforementioned copending applications.

As will be readily apparent, one may employ a non-carbonaceous reducing agent within any of the reduction operations described above, for convenience, or for purposes of obtaining end-products of low-carbon content. Furthermore, in the treatment of ores which are deficient with respect to their natural iron oxide content from the standpoint of operations conducted in accordance with the principles of this invention, as may be the case for some of the serpentines or other nickel-bearing silicates, one may supplement their normal iron content by the addition of iron oxide, iron ore or metallic scrap iron to a furnace charge in any stage.

Apart from the very desirable general handling properties characteristic of the preferred magnesia-silica and magnesia-lime-silica slag systems of the invention as noted hereinbefore, and in contrast with the normal tendency of other high-iron slags to attack the furnace linings, we have found that our unique slags are high-melting point, relatively refractory masses exhibiting the tendency to form their own protective crucibles within the furnace chamber. Thus, for compositions corresponding to approximately one part magnesia or magnesia and lime, to each part silica, the melting point of the resulting slag will usually be of the order of 1500° C., whereas at a magnesia-silica or magnesia-lime-silica ratio of approximately two to one, the slags will have a melting point of the order of 1700° C. The unique crucible-forming properties of the slags can be used to excellent advantage, through adjustment of the magnesia-silica or magnesia-lime-silica ratios within the range specified, to overcome furnace operating difficulties encountered with ores of various high-iron contents.

It is believed that the process of the invention may be best understood by reference to the following specific examples illustrating the application of the foregoing principles and procedures in the treatment of a typical laterite ore:

EXAMPLE I

A Cuban laterite ore was calcined at a temperature above 1100° C., to provide a stabilized ore charge of the following composition:

| | Percent |
|---|---|
| Ni | 1.49 |
| Co | 0.25 |
| Fe | 52.95 |
| $Al_2O_3$ | 9.32 |
| $SiO_2$ | 3.08 |
| CaO | 0.40 |
| MgO | 1.11 |
| Cr | 1.80 |

The calcined ore, in amount of 100 parts, was admixed with 7 parts by weight of magnesia, 7 parts by weight of lime, and 3.7 parts by weight of silica (natural alumina content serves to fluidize the slag to a considerable extent) in the form of quarzite. As pointed out hereinbefore, in actual operation on a continuous basis, the combined ore and fluxes are preferably calcined to a constant composition. The resulting charge was smelted within an electric furnace on a batch basis in the presence of 9.7 parts by weight of coal of 80% fixed carbon content.

Following the reduction smelting, there were recovered 7.0 parts by weight of a ferronickel alloy which analyzed 20% nickel and 3.0% cobalt, and 91.5 parts by weight of a molten slag product of the following analysis:

| | Percent |
|---|---|
| Ni | 0.08 |
| Fe | 48.20 |
| $Al_2O_3$ | 10.2 |
| $SiO_2$ | 7.4 |
| CaO | 8.1 |
| MgO | 8.9 |
| Cr | 2.0 |

The molten slag was run into a second furnace together with 4.6 parts by weight of added silica flux, and 16 parts by weight of coal of 80% fixed carbon content, wherein it was smelted with the production of 43.3 parts by weight of a pig iron product of the analysis:

| | Percent |
|---|---|
| C | 3.0 |
| Si | 1.15 |
| Cr | 0.08 |
| Ni | 0.07 | and 47.4 parts by weight of a residual slag of the following analysis:

| | Percent |
|---|---|
| Fe | 7.31 |
| Cr | 3.7 |
| $Al_2O_3$ | 21.2 |
| $SiO_2$ | 25.8 |
| CaO | 17.4 |
| MgO | 19.1 |

A quantity of the foregoing slag was reduced with carbon while still hot with the production of a ferrochromium product analyzing 21.3% chromium.

EXAMPLE II

A Greek-originating lateritic iron ore having the calcined analysis presented below was treated on a continuous basis in a prototype commercial plant consisting of a rotary kiln and two 1000 kva. electric furnaces operating through the first and second stages of the process of the invention, i.e., the production of ferronickel in a first stage smelting operation, followed by re-processing of its residual slag in a second stage smelting operation for the production and recovery of metallic iron:

| | Percent |
|---|---|
| Fe | 49.35 |
| $SiO_2$ | 8.40 |
| CaO | 3.64 |
| MgO | 1.41 |
| $Al_2O_3$ | 6.39 |
| Ni | 0.76 |
| Mn | 0.19 |
| Cr | 2.40 |
| Co | 0.07 |
| S | 0.027 |
| P | 0.020 |
| L.O.I. | 7.02 |

During the above-described prototype operations, the composition of the furnace charges to the first stage were varied with respect to fluxing components, carbonaceous reducing material, etc., to collect representative data on the different operating conditions possible in accordance with the general principles and procedures of the invention as described hereinbefore. The following tabulated data illustrate the general composition of various different charges which were subsequently processed through the second stage of the process on a continuous basis:

*Table I*

| Mix Number | Ore (lbs.) | Dolomite (lbs.) | Coal (lbs.) 18% Volatile (to kiln) | Coal (lbs.) All as Anthracite (To furnace) | Lbs. Magnesite | Lbs. Quartzite | Lbs. Serpentine | Base-acid ratio $\frac{CaO\,K\,MgO}{SiO^2}$ As CaO | As MgO | Mix was Employed in Taps Numbers |
|---|---|---|---|---|---|---|---|---|---|---|
| 1 | 1,000 | ¹ 172 | 67 | | | | | 2.85/1 | 2.03/1 | 1–4 |
| 1-A | 1,000 | ¹ 172 | 80 | | | | | 2.85/1 | 2.03/1 | 5–45 |
| 1 | 1,000 | ² 300 | 80 | | | | | 2.85/1 | 2.03/1 | 46–53 |
| 1-C | 1,000 | ² 300 | 60 | | | | | 2.85/1 | 2.03/1 | 54–60 |
| 1-D | 1,000 | ² 300 | 40 | | | | | 2.85/1 | 2.03/1 | 61–78 |
| 2-A | 1,000 | ¹ 160 | | X | | | | 2.82/1 | 2.01/1 | 79–146 |
| 2-B | 1,000 | ¹ 144 | | X | | | | 2.56/1 | 1.85/1 | 147–243 |
| 2-C | 1,000 | ¹ 144 | | X | | 24 | | 2/1 | 1.42/1 | 244–253 |
| 3 | 1,000 | | | X | 94 | | | 2.1/1 | 1.5/1 | 254–261 |
| 3-A | 1,000 | | | X | 70 | | | 1.75/1 | 1.25/1 | 262–270 |
| 3-B | 1,000 | | | X | 108 | | 200 | 1.75/1 | 1.25/1 | 271–282 |
| 3-C | 1,000 | | | X | 90 | | 100 | 1.75/1 | 1.25/1 | 283–285 |
| 3-D | 1,000 | | | X | 46 | | 50 | 1.4/1 | 1/1 | 286–297 |
| 4 | 1,000 | ¹ 96 | | X | | | 100 | 1.8/1 | 1.3/1 | 298–309 |
| 5 | 1,000 | ¹ 133 | | X | | 24 | | 2/1 | 1.42/1 | 310–317 |
| 5-A | 1,000 | ¹ 133 | | X | | | | 2.45/1 | 1.75/1 | 318–332 |

¹ Burned.  ² Raw.

The following tabulated data illustrate the actual results obtained upon smelting typical charges from among the various different mixes set forth in Table I. The respective taps are cross-indexed to Table I by means of the tap number set forth in the first column on Table II, as compared with the corresponding tap numbers associated with the mixes in the last column of Table I. In all instances, the addition of carbonaceous reducing material to the furnaces was controlled in accordance with the nickel content desired in the ferronickel alloy, and the residual iron oxide which was desired in the second stage for insuring retention of chromium oxide in this slag.

The slags from the second stage reduction as tabulated below were further reduced in a separate furnace to produce chromium-containing iron products of average composition: 27 to 30 percent chromium; 5 to 6 percent carbon; and very low silicon (0.2 to 0.5%).

magnesia and calcium oxide, and magnesia-calcium oxide-bearing materials of natural origin, in respective amounts as required in combination with the natural silica, magnesia and calcium oxide contents of said ore, to provide, after separation of said ferronickel product, an iron oxide-bearing residual slag having a base-to-acid ratio within the range of from 1.0 to 2.25 parts by weight base, calculated as MgO, to each part by weight silica.

2. The process of claim 1 and wherein the constituency of said residual slag is controlled to provide a base-to-acid ratio within the range of from 1.0 to 1.25 parts by weight base, calculated as MgO, to each part by weight silica.

3. The process of claim 1 wherein said fluxing agent is magnesia and the constituency of said residual slag is controlled to provide a base-to-acid ratio within the range of from 1.0 to 1.25 parts by weight base, calculated as MgO, to each part by weight silica.

*Table II*

| Tap Number | Furnace Lining | Fe | First-stage Slag (Percent Analysis) | | | | | First-stage Percent Nickel Content FeNi | Second-stage Metallic Iron (Percent Analysis) | | | | Slag Second-stage (Percent Analysis) | |
|---|---|---|---|---|---|---|---|---|---|---|---|---|---|---|
| | | | Cr | Ni | CaO | MgO | SiO₂ | | Si | Ni | Cr | C | Cr | Fe |
| 76 | Carbon | 46.59 | 2.67 | .04 | 12.20 | 9.12 | 11.06 | 8.20 | .32 | .10 | .06 | .74 | 4.96 | 8.92 |
| 92 | Carbon | 43.78 | 2.42 | .02 | 11.29 | 6.37 | 13.50 | 5.23 | .10 | .08 | .18 | 2.56 | 6.08 | 6.74 |
| 252 | Carbon | 44.78 | 1.86 | .03 | 11.09 | 7.56 | 12.30 | 5.30 | .19 | .20 | .12 | .66 | 5.39 | 6.66 |
| 270 | Magnesite | 45.19 | 3.01 | .05 | 4.68 | 6.72 | 7.33 | 6.60 | .05 | .26 | Tr. | .46 | 4.86 | 4.94 |
| 282 | Magnesite | 37.31 | 2.98 | .04 | 3.53 | 16.90 | 15.20 | 6.40 | .05 | .28 | Tr. | .48 | 3.58 | 8.20 |
| 288 | Magnesite | 40.84 | 2.06 | .04 | 4.37 | 12.58 | 17.30 | 4.90 | .08 | .25 | Tr. | .19 | 4.28 | 7.96 |
| 295 | Magnesite | 47.19 | 1.90 | .05 | 4.03 | 8.85 | 8.86 | 6.10 | .05 | .23 | .08 | .36 | 4.0 | 5.46 |
| 302 | Magnesite | 42.49 | 2.32 | .04 | 8.54 | 8.69 | 12.50 | 6.0 | .05 | .17 | .11 | .34 | 4.75 | 7.83 |
| 319 | Carbon | 47.26 | 3.0 | .02 | 8.85 | 5.95 | 7.90 | 9.19 | .07 | .26 | .22 | 1.34 | 4.86 | 6.43 |
| 333 [1] | Carbon | 47.14 | | .08 | 9.06 | 5.50 | 10.83 | 14.13 | .05 | .20 | .11 | .88 | 3.24 | 8.2 |
| 334 [1] | Carbon | 46.64 | | .05 | 8.11 | 6.33 | 10.87 | 11.77 | .05 | .19 | .13 | 1.31 | 4.75 | 6.71 |

[1] Fluxed with dolomite and quartzite.

The above-described prototype work demonstrated that the unique slag systems of the invention are ideally suited for use in continuous operations, serving to overcome the principal disadvantages inherent in conventional lime-fluxed basic reduction burdens, as well as acidic slag systems, when carried into similar continuous operations. Specifically, the relatively low latent heat of fusion of the slags (approximately 63 b.t.u. per pound) coupled with their high refractoriness (low rate of heat transfer) function to impart numerous operating advantages which are not combined within heretofore customary slag systems. For example, whereas lime-fluxed slags also have relatively low heats of fusion, they lack the very desirable refractory characteristics of the slag systems of the invention. The acidic slags, on the other hand, usually possess relatively higher heats of fusion, with the result that they are not as easily melted, and do not match the protective crucible-forming properties of our slags which are so important to continuous operations.

This application constitutes a continuation-in-part replacement of our former copending U.S. application Ser. No. 688,124 of October 4, 1957, which was, in turn, a continuation-in-part replacement of our former U.S. application Ser. No. 677,817 of August 13, 1957, both of which applications are now abandoned.

Having thus described the subject matter of our invention, what it is desired to secure by Letters Patent is:

1. In a process for the treatment of ore containing iron oxide and a minor proportion of nickel oxide, involving successive selective reduction of the ore and its residual slag for the production and recovery of separate ferronickel and iron products, respectively, the improvement that comprises fluxing said ore for the initial selective reduction and recovery of said ferronickel product by the addition thereto of silica and, as a basic flux having a magnesia content of at least 21%, at least one fluxing agent selected from the group consisting of magnesia, magnesia-bearing materials of natural origin, mixtures of 4. The process of claim 1 wherein said fluxing agent is dolomite and the constituency of said residual slag is controlled to provide a base-to-acid ratio within the range of from 1.0 to 1.25 parts by weight base, calculated as MgO, to each part by weight silica.

5. In a process for the treatment of ore containing iron oxide and a minor proportion of nickel oxide, involving successive selective reduction of the ore and its residual slag for the production and recovery of separate ferronickel and iron products, respectively, the improvements that comprise fluxing said ore for the initial selective reduction and recovery of said ferronickel product by the addition thereto of silica and, as a basic flux having a magnesia content of at least 21%, at least one fluxing agent selected from the group consisting of magnesia, magnesia-bearing materials of natural origin, mixtures of magnesia and calcium oxide, and magnesia-calcium oxide-bearing materials of natural origin, in respective amounts as required in combination with the natural silica, magnesia and calcium oxide contents of said ore, to provide, after separation of said ferronickel product, an iron oxide-bearing residual slag having a base-to-acid ratio within the range of from 1.0 to 1.25 parts by weight base, calculated as MgO, to each part by weight silica; and treating said iron oxide-bearing slag directly by selective reduction for the production and recovery of metallic iron.

6. In a process for the treatment of an ore containing iron oxide and minor proportions of nickel oxide and chromium oxide, involving successive selective reduction of the ore and slag for the production and recovery of separate ferronickel and iron products, respectively, the improvements that comprise fluxing said ore with silica and a basic fluxing agent containing at least 21% magnesia selected from the group consisting of magnesia, magnesia-bearing materials of natural origin, mixtures of magnesia and calcium oxide, and magnesia-calcium oxide-bearing materials of natural origin, and maintaining the ferronickel and iron products substantially free of chromium metal by controlling the successive reduction operations to provide for the production of a final residual slag product containing from three to ten percent (3–10%) by weight of iron oxide and also containing the chromium content of the original ore in oxide form.

7. In a process for the treatment of an ore containing iron oxide and minor proportions of nickel oxide and chromium oxide, involving successive selective reduction of the ore and slag for the production and recovery of separate ferronickel and iron products, respectively, the improvements that comprise fluxing said ore with silica and a basic fluxing agent containing at least 21% magnesia selected from the group consisting of magnesia, magnesia-bearing materials of natural origin, mixtures of magnesia and calcium oxide, and magnesia-calcium oxide-bearing materials of natural origin, maintaining the ferronickel and iron products substantially free of chromium metal by controlling the successive reduction operations to provide for the production of a final residual slag product containing a portion of the iron content of the original ore in oxide form and also containing the chromium content of the original ore in oxide form, and subjecting said final residual slag product to a further reduction smelting for the production and recovery of a ferrochromium alloy.

8. Process for beneficiating an ore containing iron oxide and a minor proportion of nickel oxide by selectively reducing and removing nickel therefrom in the form of a ferronickel alloy that comprises, forming a reduction charge of the ore with added basic and acidic fluxing materials in respective amounts as required in combination with the natural base and acid constituents of said ore to provide for the production of a substantially nickel-free, refractory iron oxide-bearing slag product having a base-to-acid ratio within the range of from 1.0 to 2.25 parts by weight basic components, calculated as MgO, to each part by weight acidic components said basic flux material having a magnesia content of at least 21% and consisting of at least one fluxing agent selected from the group consisting of magnesia, magnesia-bearing materials of natural origin, mixtures of magnesia and calcium oxide, and magnesia-calcium oxide-bearing materials of natural origin, subjecting said charge to reduction smelting in the presence of a reducing agent in an amount sufficient to effect reduction to the elemental state of substantially all of the nickel oxide content of the original ore and a portion of the iron oxide content of the ore for alloying with the metallic nickel for the production of a molten ferronickel alloy and molten refractory iron oxide-bearing slag, and separating and recovering said ferronickel alloy from the molten slag.

9. Process for beneficiating an ore containing iron oxide and a minor proportion of nickel oxide by selectively reducing and removing nickel therefrom in the form of a ferronickel alloy that comprises, forming a reduction charge of the ore with added basic and acidic fluxing materials in respective amounts as required in combination with the natural base and acid constituents of said ore to provide for the production of a substantially nickel-free iron oxide-bearing slag product having a base-to-acid ratio within the range of from 1.0 to 1.25 parts by weight basic components, calculated as MgO, to each part by weight acidic components, said basic flux material having a magnesia content of at least 21% and consisting of at least one fluxing agent selected from the group consisting of magnesia, magnesia-bearing material of natural origin, mixtures of magnesia and calcium oxide, and magnesia-calcium oxide-bearing materials of natural origin, subjecting said charge to a reduction smelting in the presence of added carbonaceous reducing material in an amount sufficient to effect reduction to the elemental state of substantially all of the nickel oxide content of the original ore and that portion only of the iron oxide content of the ore required for alloying with the metallic nickel for the production of a molten ferronickel alloy of desired iron-nickel composition and molten iron oxide-bearing slag, and separating and recovering said ferronickel alloy from the molten slag.

10. A continuous process for the recovery of nickel and iron values from iron-nickel-bearing ores that comprises, forming a reduction charge of the ore with added silica, and a magnesia-bearing fluxing material in respective amounts as required in combination with the natural magnesia, calcium oxide and silica contents of said ore to provide for the production of molten slag having a base-to-acid ratio within the range of from 1.0 to 1.25 parts by weight basic components, calculated as MgO, to each part by weight acidic components, said slag containing approximately one mole of magnesia for each mole of calcium oxide contained therein, subjecting said charge to reduction smelting in the presence of a carbonaceous reducing agent in an amount sufficient to effect reduction to the metallic state of substantially all of the nickel content of the original ore and a portion of the iron content thereof for the production of a molten ferronickel alloy and molten slag of base-acid ratio within said range of from 1.0 to 1.25 parts base to each part acid and containing the major portion of the iron content of the original ore, separating and recovering said ferronickel alloy from the molten slag, subjecting the molten slag to a second reduction smelting in the presence of a carbonaceous reducing agent for the production and recovery of molten metallic iron and molten residual slag, and separating and recovering said molten metallic iron from the molten residual slag.

11. A continuous process for the recovery of nickel, iron and chromium values from nickel-iron-chromium-bearing ores that comprises, forming a reduction charge of the ore with added silica, and a magnesia-bearing fluxing material in respective amounts as required in combination with the natural magnesia, calcium oxide and silica contents of said ore to provide for the production of molten slag having a base-to-acid ratio within the range of from 1.0 to 1.25 parts by weight basic components, calculated as MgO, to each part by weight acidic components, said slag containing approximately one mole of magnesia for each mole of calcium oxide contained therein, subjecting said charge to reduction smelting in the presence of a carbonaceous reducing agent in an amount sufficient to effect reduction to the metallic state of substantially all of the nickel content of the original ore and a portion of the iron content thereof for the production of a molten ferronickel alloy and a molten refractory slag of base-acid ratio within said range of from 1.0 to 1.25 parts base to each part acid and containing the major portion of the iron content of the original ore, separating and recovering said ferronickel alloy from the molten refractory slag, subjecting the molten refractory slag to a second reduction smelting in the presence of a carbonaceous reducing agent in an amount sufficient to effect reduction to the metallic state of the major portion of the iron oxide content of said slag while retaining from six to eight percent (6–8%) of the iron oxide in unreduced form within the residual slag remaining after separation of said metallic iron, said residual unreduced iron oxide functioning to hold the chromium oxide content of the original ore within said residual slag, and subjecting said residual slag to a third reduction smelting in the presence of a carbonaceous reducing agent in an amount sufficient to effect reduction to the metallic state of the iron oxide and the chromium oxide contained therein for the production and recovery of a ferrochromium alloy.

12. A composition of matter for use in the carbothermic processing of metallurgical ores containing iron oxide and nickel oxide, that comprises a high-melting point, refractory material of relatively high iron oxide content and containing magnesia, calcium oxide and silica in relative proportions sufficient to provide a base-acid ratio for the compositions within the range of from 1.0 to 2.25 parts base, calculated as MgO and exclusive of iron oxide, to each part by weight silica, the magnesia and calcium oxide being present in approximately equal molar proportions.

13. A composition of matter for use in the carbothermic processing of metallurgical ores containing iron oxide and nickel oxide, that comprises a high-melting point, refractory material of relatively high iron oxide content and containing magnesia, calcium oxide and silica in relative proportions sufficient to provide a base-acid ratio for the composition within the range of from 1.0 to 1.25 parts base, calculated as MgO and exclusive of iron oxide, to each part by weight silica, the magnesia and calcium oxide being present in approximately equal molar proportions.

14. In a process for the treatment of ore containing iron oxide and a minor proportion of nickel oxide, involving successive selective reduction of the ore and its residual slag for the production and recovery of separate ferronickel and iron products, respectively, the improvement that comprises fluxing said ore for the initial selective reduction and recovery of said ferronickel product by the addition of silica thereto, and a fluxing agent selected from the group consisting of magnesia, magnesia-bearing materials of natural origin, mixtures of magnesia and calcium oxide, and magnesia-calcium oxide-bearing materials of natural origin, in respective amounts as required in combination with the natural silica, magnesia and calcium oxide contents of said ore, to provide, after separation of said ferronickel product, an iron oxide-bearing residual slag having a base-to-acid ratio within the range of from 1.0 to 2.25 parts by weight base, calculated as MgO, to each part by weight silica, the magnesia and calcium oxide contents of said residual slag being controlled to provide approximately one mole of magnesia for each mole of calcium oxide contained therein.

15. In a process for the treatment of ore containing iron oxide and a minor proportion of nickel oxide, involving successive selective reduction of the ore and its residual slag for the production and recovery of separate ferronickel and iron products, respectively, the improvements that comprise fluxing said ore for the initial selective reduction and recovery of said ferronickel product by the addition of silica thereto, and a fluxing agent selected from the group consisting of magnesia, magnesia-bearing materials of natural origin, mixtures of magnesia and calcium oxide, and magnesia-calcium oxide-bearing materials of natural origin, in respective amounts as required in combination with the natural silica, magnesia and calcium oxide contents of said ore, to provide, after separation of said ferronickel product, an iron oxide-bearing residual slag having a base-to-acid ratio within the range of from 1.0 to 1.25 parts by weight base, calculated as MgO, to each part by weight silica, the magnesia and calcium oxide contents of said iron oxide-bearing residual slag being controlled to provide approximately one mole of magnesia for each mole of calcium oxide contained therein; and treating said iron oxide-bearing slag directly by selective reduction for the production and recovery of metallic iron.

16. In a process for the recovery of nickel, iron and chromium values from an ore containing a major proportion of iron and minor proportions of nickel and chromium, the steps comprising forming a reduction charge of the ore and a flux, said flux including, as a basic flux material having a magnesia content of at least 21%, at least one fluxing agent selected from the group consisting of magnesia, magnesia-bearing materials of natural origin, mixtures of magnesia and calcium oxide, and magnesia-calcium oxide-bearing materials of natural origin, said flux being employed in a proportion, as required in combination with the natural silica, magnesia and calcium oxide contents of said ore, to provide for the production of a molten slag having a base-to-acid ratio within the range of from 1.0 to 2.25 parts by weight of basic components, calculated as MgO, to each part by weight of acidic components; subjecting said charge to reduction smelting in the presence of a reducing agent in an amount sufficient to effect reduction to the metallic state of substantially all of the nickel content of the ore and a portion of the iron content thereof and thereby forming a molten ferronickel alloy and a molten refractory primary slag of said specified base-to-acid ratio, said slag containing a major proportion of the iron content of the ore; separately recovering said ferronickel alloy and said primary slag; subjecting said primary slag to a second reduction smelting operation in the presence of a reducing agent in an amount sufficient to effect reduction to the metallic state of a major proportion of the iron oxide content of said primary slag, said amount of iron oxide reduced being so controlled that the secondary slag resulting from said second smelting operation retains from 3–10% by weight unreduced iron oxide, said retained iron oxide functioning to hold the chromium oxide content of the ore within said secondary slag; separately recovering from said second smelting operation said secondary slag and an iron product which is substantially undiluted by chromium, and subjecting said secondary slag to a third reduction smelting operation in the presence of a reducing agent in an amount sufficient to effect reduction to the metallic state of the iron oxide and chromium oxide contained therein with the production and recovery of a ferrochromium product.

17. The process of claim 16 wherein the base-to-acid ratio of said primary slag is in the range of from 1.0 to 1.25 parts by weight of basic components, calculated as MgO, to each part by weight of acidic components, and said primary slag contains approximately one mole of magnesia for each mole of calcium oxide contained therein.

18. The process of claim 16 wherein said secondary slag contains 6–8% by weight unreduced iron oxide.

References Cited in the file of this patent
UNITED STATES PATENTS

| | | |
|---|---|---|
| 2,098,176 | Udy | Nov. 2, 1937 |
| 2,395,029 | Baily | Feb. 19, 1946 |